United States Patent [19] [11] 4,010,068
Cooper [45] Mar. 1, 1977

[54] REMOVAL OF RADIOACTIVE CONTAMINATION FROM A NUCLEAR REACTOR COOLANT

[75] Inventor: Martin H. Cooper, Monroeville, Pa.
[73] Assignee: Westinghouse Electric Corporation, Pittsburgh, Pa.
[22] Filed: Mar. 3, 1975
[21] Appl. No.: 554,786

Related U.S. Application Data

[63] Continuation of Ser. No. 293,238, Sept. 28, 1972, now Defensive Publication No. T921,016.

[52] U.S. Cl. ................................. 176/37; 176/38
[51] Int. Cl.² ........................................ G21C 19/32
[58] Field of Search ............... 176/37, 38; 62/55.5; 137/171; 55/DIG. 15; 210/42, 51

[56] References Cited
UNITED STATES PATENTS 3,693,959   9/1972   Swinhoe et al. ..................... 266/37

FOREIGN PATENTS OR APPLICATIONS 1,052   1/1969   Japan

Primary Examiner—Samuel W. Engle
Assistant Examiner—Ralph Palo
Attorney, Agent, or Firm—Edward L. Levine; Z. L. Dermer

[57] ABSTRACT

A system for removing radioactive fission products from a liquid metal reactor coolant. Isotopic diluents and reacting compounds are added to hot liquid sodium. The reactants isotopically exchange or chemically react with the fission products and are precipitated out of solution in a first cold trap. When the supply of reactants is exhausted, the flow is reversed; the first trap then functions to supply the reactants and the precipitation occurs in a second cold trap. The process operates continuously and reversibly.

12 Claims, 2 Drawing Figures

REMOVAL OF RADIOACTIVE CONTAMINATION FROM A NUCLEAR REACTOR COOLANT

This is a continuation of application Ser. No. 293,238 filed Sept. 28, 1972, now Defensive Publication T921,016.

BACKGROUND OF THE INVENTION

1. Field of the Invention

This invention relates generally to nuclear reactor power plants and more particularly to the removal of radioactive contaminants from the coolant of a liquid metal-cooled fast breeder nuclear reactor.

2. Description of the Prior Art

In a nuclear reactor power plant electricity is generated from heat which is produced by fission of fissile materials. In an initial phase of this process a reactor coolant, such as liquid sodium, is used to remove the heat from fuel elements which contain the fissile materials. The reactor coolant circulates through a closed flow system known as the primary system which is made up of a main coolant circulating pump, either a heat exchanger or a steam generator, reactor vessel, and connecting piping arranged in series flow connection. The primary system is closed in the interest of safety since a closed system prevents the release, to the environment, of radioactive particles should the primary system become contaminated. One way that the contamination may occur is by release of radioactive fission products from failed fuel elements. Another way is from the use of vented fuel elements which operate by purposely allowing the release of fission products rather than trying to keep them contained.

In the past, the radioactive contamination was removed, although not effectively, by a cold trapping technique which operates by lowering the temperature of a diverted portion of the reactor coolant causing the contamination to precipitate out of solution. Recently, however, major advances were made in the art by using the cold trapping technique in conjunction with adding certain chemicals or reactants to the hot reactor coolant to enhance the precipitation of the contamination. That is, high concentrations of reacting chemicals or isotopic diluents are mixed with a diverted stream of reactor coolant and the radioactive contamination, in the form of isotopically exchanged or insoluble compounds, are precipitated out of solution in a cold trap. The addition of non-radioactive iodine for example, to hot liquid sodium removes as much as 99.9% of the radioactive isotopes, iodine-131 and iodine-125. Also, the addition of hydrogen to hot liquid sodium removes essentially all of the tritium, cesium-137 and iodine-131 from the reactor coolant. Even these recently employed methods, however, have certain disadvantages. A principal disadvantage is that the amount of radioactive contamination removed is quite small relative to the amount of reactants or additives used. This means that the precipitant in the cold trap consists primarily of unreacted chemicals and unexchanged isotopic diluents. Consequently, the cold trap must be large and must either be replaced or cleaned on a frequent basis. This severely limits the availability of the plant for the production of electrical energy. The present invention eliminates this highly undesirable feature of the prior art.

SUMMARY OF THE INVENTION

The invention described herein consists of an oscillating cold trap system in which one trap is loaded with reactants while a second trap, in series flow connection thereto, is used to precipitate the radioactive contamination and the excess reactants. When the reactants in the first trap are exhausted, the direction of flow is reversed; the heating and cooling of the traps are also reversed. The second cold trap then acts as the reactant supply, while the first cold trap operates to remove the impurities by precipitation. When the excess reactant has been exhausted from the second cold trap, the flow is again switched, reversing the roles of the two cold traps. The system is continuously and reversibly operated in this manner until the reactants can no longer be used to precipitate radioactive contamination contained within the reactor coolant.

Sodium hydride, sodium oxide, and sodium iodide are typical reactants loaded into the oscillating cold trap system. These will effectively and efficiently remove such radioactive contamination as tritium, barium-140, cesium-141, zirconium-95, iodine-131 and iodine-125.

BRIEF DESCRIPTION OF THE DRAWING

Other advantages of the invention will be apparent from the following detailed description taken in consideration with the accompanying drawings, in which.

DESCRIPTION OF THE PREFERRED EMBODIMENTS

Figure 1:
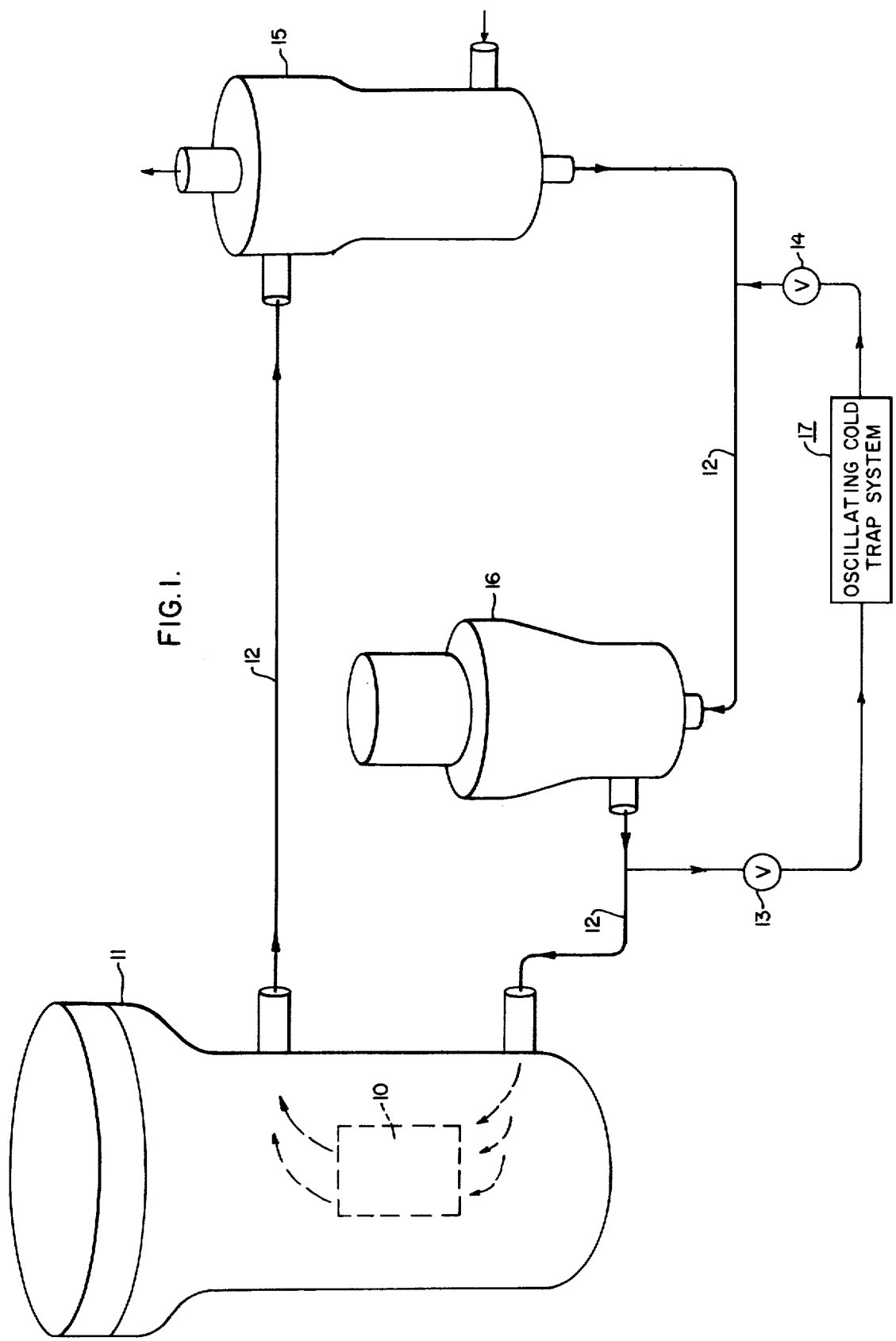
FIG. 1 is a schematic flow diagram of a nuclear reactor primary system incorporating an oscillating cold trap system.

Referring now to FIG. 1, a reactor coolant such as liquid sodium, is heated to reactor operating temperature on passage through a nuclear core 10 contained within a reactor vessel 11. The hot liquid sodium exits from the reactor vessel 11 and enters a main reactor coolant flow line 12. The hot reactor coolant transfers its heat to another flow system coupled in sealing arrangement with the reactor primary system within item 15, which may be either a steam generator or a heat exchanger, depending upon the particular type of nuclear reactor to which this invention is applied. Upon exiting from item 15, the cooled reactor coolant is circulated back into the reactor vessel 11 by means of a main coolant circulating pump 16, repeating the described flow cycle.

An oscillating cold trap system 17 is provided across the main coolant circulating pump 16. Valves 13 and 14 isolate the oscillating cold trap system 17 from the reactor primary system during normal reactor operation. After the reactor has been operated for an extended period of time, or when the reactor coolant has become contaminated by radioactive fission product nuclides such as tridium, barium-130, cesium-141, zirconium-95, iodine-131, and iodine-125, it then becomes desirable to remove this contamination. The oscillating cold trap system 17 is put into operation by opening isolation valves 13 and 14. This causes a portion of the hot reactor coolant to be diverted from the reactor primary system and flow through the oscillating cold trap system 17. The hot contaminated reactor coolant is purified within the oscillating cold trap system 17 and then flows back into the main reactor coolant flow line 12 of the primary system where it joins with the bulk of the reactor coolant prior to entering the main coolant circulating pump 16.

The reactor coolant flowing through the oscillating cold trap system 17 is only a portion of the total reactor coolant flow. Therefore, the reactor coolant is not completely purified of all the radioactive fission products nuclides. But, contained operation of the system lowers the concentration of radioactive contamination in the total reactor coolant to an effectively safe level.

Figure 2:
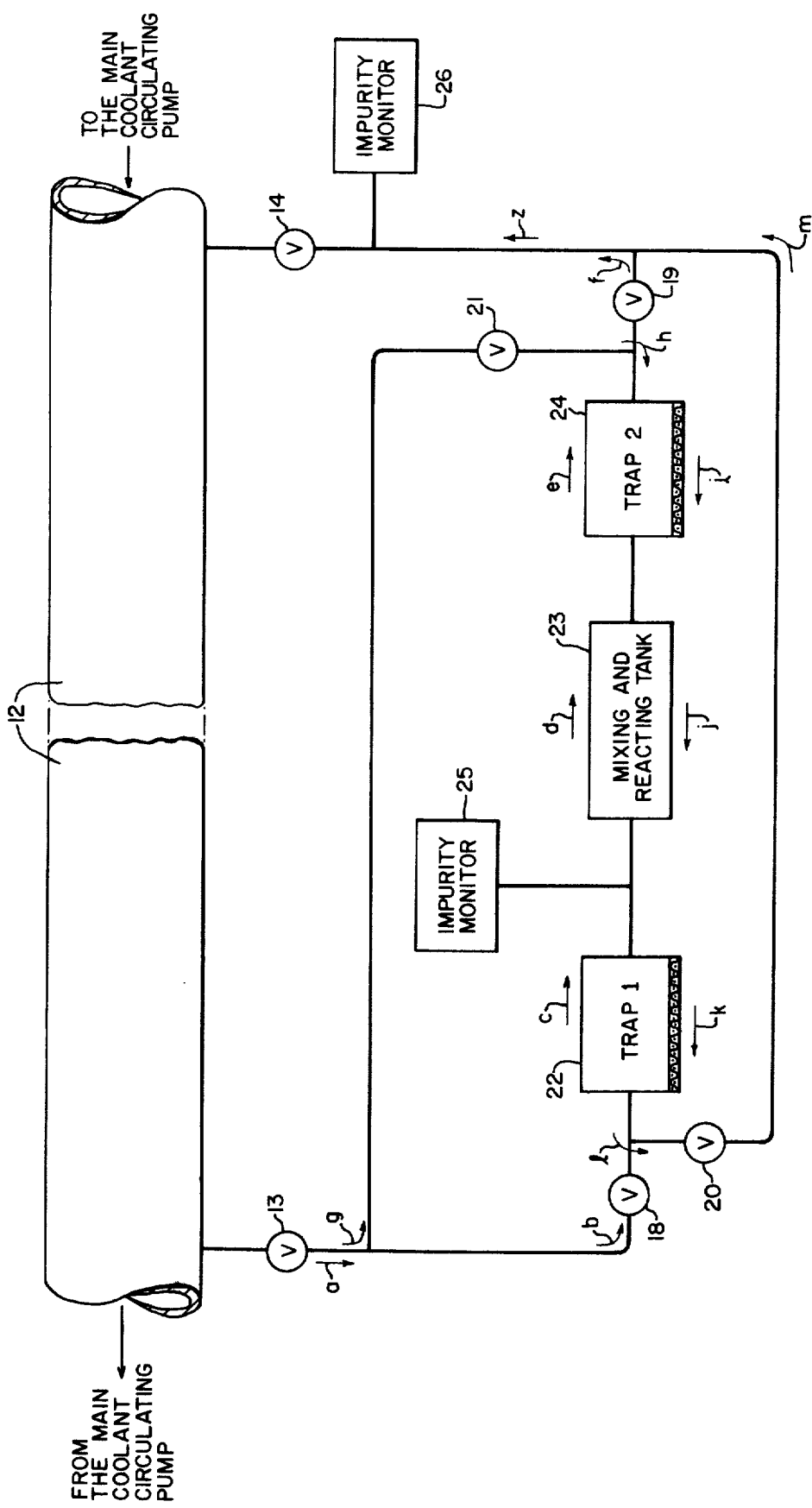
FIG. 2 is a schematic flow diagram of one embodiment of the oscillating cold trap system.

The details of the oscillating cold trap system are more completely shown in FIG. 2 to which reference is now made. With valves 13, 18, 19 and 14 open and valves 20 and 21 closed, the portion of reactor coolant flowing through the oscillating cold trap system 17 flows in the direction indicated by arrows A, B, C, D, E, F and Z. Hot contaminated reactor coolant, such as liquid sodium at approximately 1000° F, enters the first cold trap 22 which has been preloaded with the desired reactant or mixture of reactants. These may include high concentrations of isotopic diluents such as sodium iodide and sodium hydride, and reacting chemical species such as sodium oxide. The high temperature of the reactor coolant causes dissolution of the reactants into the reactor coolant. The diverted stream of reactor coolant, now saturated with the reactants exits from cold trap 22 which is not being cooled and enters a mixing and reacting tank 23. The mixing and reacting tank 23 provides mixing to assure adequate reaction between the fission product contamination contained within the reactor coolant and the dissolved reactants which are also contained within the reactor coolant. The still contaminated reactor coolant flows into a second cold trap 24 where the temperature of the reactor coolant is lowered to approximately 250° F. At this temperature, the radioactive fission product contamination and the excess reactants are precipitated out of solution. The precipitation or nucleation occurs within cold trap 24 on a suitable surface provided therein, such as wire mesh. Purified reactor coolant exits from cold trap 24 and is reheated to approximately 1000° F prior to being reintroduced into the main coolant flow line 12.

An impurity monitor 25, such as an electrochemical oxygen meter or a hydrogen diffusion meter, is installed between cold traps 22 and 24. When the reactants in cold trap 22 are exhausted, the impurity monitor 25 senses the decrease in impurity level in the contaminated reactor coolant. At a predetermined decreased impurity level, the impurity monitor 25 actuates an automatic control system to reverse the direction of flow in the oscillating cold trap system 17 (FIG. 1) and to reverse the heating and cooling of the cold traps. Flow reversal is effectuated by closing valves 18 and 19 and opening valves 21 and 20. The reactor coolant now flows in a direction indicated by arrows A, G, H, I, J, K, L, M, and Z. Since cold trap 24 now contains the excess reactants, that is, reactants which have not isotopically exchanged or chemically compounded with the fission product nuclides, it operates as the reactant supply for the contaminated reactor coolant. On flowing through cold trap 24, the temperature of the reactor coolant is maintained at approximately 1000° F so that the contaminated reactor coolant becomes saturated with the excess reactants. The mixing and reacting tank 23 functions as previously by mixing the reactor coolant to assure adequate reaction between the reactant and the radioactive fission product nuclides. The temperature of the reactor coolant is decreased to approximately 250° F within cold trap 22 which now acts as the depository for the precipitated fission product nuclides and the excess reactants. The precipitated products in cold trap 22 again comprise excess reactants and isotopically exchanged or chemically compounded radioactive fission products. However, the amount of excess reactants is less than that previously contained in cold trap 24, while the amount of precipitated fission products is greater than the amount previously contained in cold trap 24. When the impurity monitor 25 senses the previously set decreased impurity level indicating the supply of reactants in cold trap 24 is exhausted then the automatic control system again reverses the direction of flow of reactor coolant through the oscillating cold trap system 17 (FIG. 1) and the heating and cooling of the col traps. The system continuously operates in this oscillating mode, transferring the excess reactants and the precipitated radioactive fission products from one cold trap to the other until there is no longer any excess reactants. At this point, it finally becomes necessary to service the oscillating cold trap system. This may be accomplished by flushing cold traps 22 and 24 by hot reactor coolant which may be obtained from an auxiliary source. Another method is to remove the wire mesh material contained within cold traps 22 and 24 on which the radioactive fission products have deposited. An impurity monitor 26 is provided in the return line of the oscillating cold trap system 17 (FIG. 1). The impurity monitor 26 senses a failure to remove the impurities and actuates an automatic control system which closes valves 13 and 14 thereby isolating the oscillating cold trap system 17 (FIG. 1) from the primary system of the nuclear reactor.

Although not shown in FIG. 2 heating means are provided in the oscillating cold trap system 17 (FIG. 1) for heating the reactor coolant from the cold trap exit temperature of 250° to 1000° F prior to being reintroduced into the main coolant flow line 12. For optimal efficiency the heat rejected by the operating cold trap, 22 or 24, may be used as a heat source for heating the purified reactor coolant prior to being reintroduced into the nuclear reactor primary system.

Typical impurities removed from a primary system of a nuclear reactor such as a liquid metal-cooled fast breeder reactor are:

1. NaH (sodium hydride will isotopically exchange with H-3 (tritium) to form sodium tritide. Precipitation of sodium tritide in the operating cold trap will retain most of the H-3 in the cold trap system, thus preventing its diffusion from the primary system to the environment.

2. $Na_2O$ (sodium oxide) will react with rare earth and alkaline earth fission products to form insoluble oxides. For example:

$$Ba + Na_2O \rightarrow BaO + 2Na$$

$$Zr + 2Na_2O \rightarrow ZrO_2 + 4Na$$

Since the oxygen concentration in the primary system will be one to five ppm, the kinetics of the above reactions will be rate limited by the availability of oxygen; hence, reaction and precipitation will be favored in the cold trap system provided by this invention because the oxygen level will be maintained at several hundred ppm in the reactant supply tank.

3. NaH (sodium hydride) will remove cesium-134 and cesium-137 by either adsorption or occlusion. It has been shown that sodium hydride is more effective in adsorbing cesium than sodium oxide.

4. NaI (sodium iodide) will isotopically exchange with fission product isotopes, iodine-131 and iodine-135 to form $Na^{131}I + Na^{135}I$. Since solubility of sodium iodide is highly temperature dependent and its solubility at cold trap temperatures is extremely low, more than 99.9% of these isotopes have been shown to be removed by this method.

From the foregoing description, taken in connection with the drawing it is seen that this invention provides an oscillating cold trap system which effectively removes radioactive fission product contamination from a liquid metal coolant of a nuclear reactor. Further, the oscillating cold trap system makes full use of reactants which enhance precipitation of the radioactive contamination such that reactor downtime is minimized and the time interval between required servicing of the cold trap is maximized.

Since numerous changes may be made in the above-described apparatus, different embodiments of the invention may be made without departing from the spirit and scope thereof. It is intended that all the matter contained in the foregoing description or shown in the accompanying drawing shall be interpreted as illustrative and not in a limiting sense.

I claim:

1. A method for removing fission products from a coolant of a nuclear reactor system by use of a flow loop connected to said reactor system, said flow loop including a pair of vessels in series, each vessel having means for cooling reactor coolant flowing therethrough to form a cold trap, and means for reversing the direction of flow through said pair of vessels, said method comprising the steps of:
    diverting a portion of said coolant flowing through said reactor system,
    adding reactant to said diverted coolant,
    said reactant serving to enhance removal of fission products from said diverted coolant,
    flowing said diverted coolant in one direction through said vessels in series, with the temperature of said diverted coolant being substantially maintained on flowing through the first of said vessels, and said diverted coolant being cooled on flowing through the second of said vessels to precipitate said fission products and excess reactant,
    returning said diverted coolant to said reactor system,
    then, when the supply of said reactant is substantially exhausted, flowing diverted coolant in an opposite direction through said vessels, substantially maintaining the temperature of said diverted coolant flowing through said second vessel to dissolve said precipitated fission products and excess reactant in said diverted coolant, and cooling said diverted coolant flowing through said first vessel to achieve further precipitation of fission products and optimal utilization of said reactant,
    returning said diverted coolant to said reactor system.

2. The method of claim 1 including the additional step of removing said precipitated fission products from said vessels in series when all of said reactant is substantially used.

3. The method of claim 1, wherein said reactant comprises an isotopic diluent, and said precipitated fission product comprises a compound containing radioactive isotopes of said diluent.

4. The method of claim 1, wherein said reactant comprising a reacting chemical species, and said precipitated fission product comprises a compound of said reacting chemical species.

5. The method of claim 1, wherein said reactant comprises reacting chemical species and isotopic diluents, and said precipitated fission products comprise a compound containing radioactive isotopes of said isotopic diluent and a compound containing said reacting chemical species.

6. The method of claim 1, wherein said reactant comprises sodium hydride, sodium oxide, and sodium iodide and said precipitated fission products comprise tritium, barium-140, cesium-141, cesium-134, cesium-137, zirconium-95, iodine-125 and iodine-131, and said coolant comprises liquid sodium.

7. A system for removing fission products from a coolant of a nuclear reactor system comprising a flow loop connected to said reactor system, for diverting coolant from said reactor system and returning said diverted coolant to the reactor system,
    said flow loop including means for adding reactant to said diverted coolant, said reactant serving to enhance removal of fission products from said diverted coolant,
    at least two vessels in series in said flow loop, each vessel having means to cool said diverted coolant flowing therethrough, said cooling means being selectively operated to cool said diverted coolant flowing through one of said vessels for precipitating fission products and unused reactant within said vessel, while the other of said vessels is being operated to maintain said diverted coolant substantially at the temperature of the coolant flowing in said reactor system,
    means connected to said flow loop for selectively reversing the direction of flow of said diverted coolant flowing through said vessels, said flow reversing means being activated simultaneously with the selective operation of said vessel cooling means to reverse the functions of said vessels thereby oscillating said precipitated fission products and unused reactant between said vessels to achieve further precipitation of fission products and optimal utilization of said reactant,
    and means associated with said flow loop for removing said precipitated fission products from said flow loop.

8. The system of claim 7 wherein said means for adding reactant to said diverted coolant comprises one of said vessels.

9. The system of claim 7 including means connected to said flow loop for mixing said reactant with means for mixing the diverted coolant flowing therethrough to achieve maximum reaction between said diverted coolant and said reactant.

10. The system of claim 7 including means connected to said flow loop between said vessels in series, for monitoring the impurity level of said diverted coolant prior to entering the vessel being selectively used to precipitate said fission products.

11. The system of claim 7 including means connected to said flow loop at a location after said vessels in series, for monitoring the fission product contamination level of the diverted coolant prior to being returned to said reactor system.

12. The system of claim 7 including means connected to said flow loop for isolating said flow loop from said reactor system.

* * * * *